US012401157B2

(12) United States Patent
Yang et al.

(10) Patent No.: US 12,401,157 B2
(45) Date of Patent: Aug. 26, 2025

(54) RELIABLE ELECTRICAL CONNECTOR WITH LATCH

(71) Applicant: Amphenol Commercial Products (Chengdu) Co., Ltd., Chengdu (CN)

(72) Inventors: Kui Yang, Chengdu (CN); Xiaodong Hu, Chengdu (CN)

(73) Assignee: Amphenol Commercial Products (Chengdu) Co., Ltd., Chengdu (CN)

( * ) Notice: Subject to any disclaimer, the term of this patent is extended or adjusted under 35 U.S.C. 154(b) by 363 days.

(21) Appl. No.: 17/973,913

(22) Filed: Oct. 26, 2022

(65) Prior Publication Data

US 2023/0126150 A1 Apr. 27, 2023

(30) Foreign Application Priority Data

Oct. 27, 2021 (CN) ......................... 202122591708.7

(51) Int. Cl.
*H01R 13/629* (2006.01)
*H01R 12/70* (2011.01)
*H01R 12/72* (2011.01)

(52) U.S. Cl.
CPC ... *H01R 13/62988* (2013.01); *H01R 12/7005* (2013.01); *H01R 12/721* (2013.01)

(58) Field of Classification Search
CPC ......................... H01R 12/7005; H01R 12/721; H01R 12/737; H01R 13/62988; H01R 13/635; H01R 13/6275

(Continued)

(56) References Cited

U.S. PATENT DOCUMENTS 3,573,706 A 4/1971 Haberlen
3,970,353 A 7/1976 Kaufman (Continued)

FOREIGN PATENT DOCUMENTS

CN 1175101 A 3/1998
CN 202633554 U 12/2012

(Continued)

OTHER PUBLICATIONS

International Search Report and Written Opinion mailed Nov. 29, 2021 for International Application No. PCT/CN2021/114671.

(Continued)

*Primary Examiner* — Marcus E Harcum
(74) *Attorney, Agent, or Firm* — Wolf, Greenfield & Sacks, P.C.

(57) ABSTRACT

A card edge connector with latches that improve the connector's reliability. The connector comprises a housing having a slot for receiving a card and latches on opposite ends of the slot for locking the card in the slot. Each latch includes a body and a projection extending in a transverse direction from a side surface of the body. The latch is pivotably connected to the housing by the projection. The latch may rotate about the projection between a locked position and an unlocked position. The body includes a lower body and an upper body wider than the lower body in the transverse direction. The projection is disposed on the lower body. The latch further includes a protrusion extending between the projection and the upper body. Such a configuration restricts the latches from moving in the housing and therefore improves the reliability of the connector.

22 Claims, 12 Drawing Sheets

(58) Field of Classification Search
USPC .......................................................... 439/327
See application file for complete search history.

(56) References Cited

U.S. PATENT DOCUMENTS 4,487,468 A 12/1984 Fedder et al.
4,734,041 A 3/1988 Bruchmann et al.
5,393,247 A 2/1995 DiOrazio et al.
5,580,257 A 12/1996 Harwath
5,810,623 A 9/1998 Regnier et al.
5,876,214 A 3/1999 McHugh et al.
5,997,312 A 12/1999 Ho et al.
6,059,585 A * 5/2000 Liao .................... H01R 12/721 439/157
6,638,105 B1 10/2003 Wu
6,645,012 B2 11/2003 Ito et al.
6,648,682 B1 11/2003 Wu
6,672,888 B1 * 1/2004 Ku .................... H01R 12/7005 439/153
6,746,256 B1 * 6/2004 Wang .................. H01R 13/633 439/159
6,749,463 B1 6/2004 Fan
7,008,250 B2 3/2006 Shuey et al.
7,008,267 B2 3/2006 Fan
7,029,298 B2 * 4/2006 Jiang .................... H01R 13/641 439/157
7,074,067 B2 7/2006 Yang et al.
7,607,949 B2 10/2009 Hsu
7,637,783 B2 12/2009 Sasaoka et al.
7,677,907 B2 3/2010 Guan et al.
7,731,541 B1 6/2010 Lee et al.
7,789,692 B2 * 9/2010 Lee .................... H01R 13/6275 439/328
7,866,995 B1 * 1/2011 Kudo ................ H01R 12/7005 439/157
7,892,006 B2 2/2011 Guan et al.
7,918,683 B1 * 4/2011 Hamner ................ H01R 12/87 439/377
7,972,171 B2 7/2011 Teh
8,142,207 B1 3/2012 Ljubijankic et al.
8,187,031 B2 5/2012 Li et al.
8,235,738 B2 * 8/2012 Li ........................ H01R 13/639 439/347
8,403,689 B2 3/2013 Li et al.
8,535,077 B2 9/2013 Shen et al.
8,730,668 B2 * 5/2014 Hu ........................ G06F 1/1658 361/679.55
9,166,317 B2 10/2015 Briant et al.
9,325,090 B2 4/2016 Shen et al.
9,685,723 B2 6/2017 Kee Mew
9,887,485 B2 2/2018 Lambie et al.
9,935,384 B1 * 4/2018 Li ...................... H01R 13/6335
10,103,476 B1 10/2018 Qiu et al.
10,135,165 B2 11/2018 Zuo
10,224,653 B2 3/2019 Niu et al.
10,301,845 B2 * 5/2019 Hsu ....................... E05B 47/023
10,651,597 B2 * 5/2020 Xie ...................... H05K 7/1409
10,741,944 B2 8/2020 Long
10,855,020 B1 12/2020 Phillips et al.
11,374,340 B2 6/2022 Tang
2005/0042928 A1 2/2005 Yi et al.
2007/0105448 A1 * 5/2007 Ju ...................... H01R 12/7005 439/636
2007/0123076 A1 * 5/2007 Sabo .................... H01R 12/721 439/157
2007/0173118 A1 7/2007 Chen
2008/0318448 A1 * 12/2008 Ringler .............. H01R 13/6275 439/78
2010/0075538 A1 3/2010 Ohshida
2010/0159723 A1 * 6/2010 Tan ...................... H01R 12/721 439/153
2011/0021045 A1 * 1/2011 Tan .................... H01R 13/7172 439/153
2011/0021080 A1 1/2011 Kamiya et al.
2011/0065297 A1 3/2011 Guan et al.
2011/0136388 A1 6/2011 Fu et al.
2011/0143563 A1 * 6/2011 Li ...................... H01R 12/7005 439/157
2011/0275238 A1 11/2011 Iijima et al.
2012/0135618 A1 * 5/2012 Shen ................ H01R 13/62988 439/152
2012/0156912 A1 * 6/2012 Shen .................. H01R 13/6275 439/327
2012/0164859 A1 * 6/2012 Li .................... H01R 13/62988 439/153
2012/0178274 A1 * 7/2012 Manickam ......... H01R 12/7005 439/157
2012/0202387 A1 8/2012 McNamara
2012/0244734 A1 * 9/2012 Fu ........................ H01R 13/648 439/637
2013/0059455 A1 * 3/2013 Li ...................... H01R 12/7005 439/157
2013/0095679 A1 * 4/2013 Li ...................... H01R 12/7005 439/157
2013/0109216 A1 * 5/2013 Chien ................ H01R 12/7005 439/345
2013/0280926 A1 10/2013 Ono
2013/0309892 A1 * 11/2013 Chen .................. H01R 12/7029 439/327
2014/0364000 A1 * 12/2014 Tang ................ H01R 13/62988 439/345
2015/0327389 A1 * 11/2015 Westphall ........ H01R 13/62988 361/748
2016/0020540 A1 1/2016 Shen et al.
2016/0118736 A1 4/2016 Hoyack et al.
2016/0190724 A1 6/2016 Mito
2016/0336667 A1 11/2016 Kee Mew
2017/0012389 A1 * 1/2017 Li ........................ H01R 12/737
2017/0302031 A1 10/2017 Cheng et al.
2019/0165518 A1 5/2019 Hsu et al.
2019/0199023 A1 6/2019 Soh
2019/0363488 A1 * 11/2019 Xie .................... H01R 12/7005
2020/0076131 A1 3/2020 Hu et al.
2020/0127397 A1 * 4/2020 Fang .................. H01R 12/7005
2020/0203867 A1 6/2020 Lu
2021/0184377 A1 * 6/2021 Dong ....................... G06F 1/185
2021/0203090 A1 * 7/2021 Gooi .......................... F16B 2/22
2021/0262502 A1 * 8/2021 Wang ................. H01R 12/7005
2021/0278880 A1 * 9/2021 Chang ................. E05B 65/0067
2021/0288423 A1 9/2021 Guo et al.
2021/0351529 A1 11/2021 Yang et al.
2021/0376508 A1 12/2021 Hu
2021/0408724 A1 * 12/2021 Li ........................... G06F 1/185
2022/0037828 A1 2/2022 Hu et al.
2022/0069496 A1 3/2022 Yi et al.
2022/0181809 A1 6/2022 Xie et al.
2022/0181811 A1 6/2022 Liu et al.
2022/0247107 A1 8/2022 Tang et al.
2022/0399682 A1 * 12/2022 Gooi .................... H01R 12/737
2023/0178935 A1 * 6/2023 Lai ..................... H01R 13/6275 439/62
2023/0180389 A1 * 6/2023 Lai ......................... H01H 13/20
2023/0180418 A1 * 6/2023 Lai .......................... G06F 1/185 361/759

FOREIGN PATENT DOCUMENTS

| | | | |
|---|---|---|---|
| CN | 203660106 | U | 6/2014 |
| CN | 105703103 | A | 6/2016 |
| CN | 108539464 | A | 9/2018 |
| CN | 212874843 | U | 4/2021 |
| CN | 214505858 | U | 10/2021 |
| EP | 0820124 | A2 | 1/1998 |
| GB | 227943 | A | 1/1925 |
| TW | 200835073 | A | 8/2008 |

(56) References Cited

FOREIGN PATENT DOCUMENTS

| | | | |
|---|---|---|---|
| TW | M475740 | U | 4/2014 |
| WO | WO 02/073819 | A2 | 9/2002 |

OTHER PUBLICATIONS

[No Author Listed], DDR5 Memory Module Sockets (SMT). Storage & Server IO. Amphenol ICC. 2022. 2 pages. URL:https://cdn.amphenol-cs.com/media/wysiwyg/files/documentation/datasheet/ssio/ssio_ddr5_smt.pdf [last accessed Mar. 22, 2022].

[No Author Listed], DDR5 SDRAM—Wikipedia. Aug. 8, 2021. 6 pages. URL:https://en.wikipedia.org/wiki/DDR5_SDRAM [last accessed on Aug. 16, 2021].

[No Author Listed], MCIO 124pos 85ohm. Amphenol Assembletech. 1 page. URL:http://www.amphenol-ast.com/v3/en/overview.aspx?classId=234 [retrieved on Apr. 11, 2022].

[No Author Listed], Mini Cool Edge IO—The Ideal Solution to Transmit Next Generation High-Speed Signal to Designated Area in Your System. Jul. 25, 2018. 2 pages. URL:https://www.amphenol-icc.com/connect/mini-cool-edge-io-the-ideal-solution-to-transmit-next-generation-high-speedsignal.html [retrieved on Apr. 11, 2022].

[No Author Listed], Mini Cool Edge IO Connector. Commercial IO. Amphenol ICC. 2022. 5 pages. URL:https://cdn.amphenol-icc.com/media/wysiwyg/files/documentation/datasheet/inputoutput/io_mini_cool_edge_io.pdf [retrieved on Apr. 11, 2022].

Armasu, What We Know About DDR5 So Far. Jun. 7, 2019. 20 pages. URL:https://www.tomshardware.com/news/what-we-know-ddr5-ram,39079.html [last accessed Jul. 21, 2022].

Hu, Electrical Connector for Compact System, U.S. Appl. No. 17/950,364, filed Sep. 22, 2022.

Yang et al., Electrical Connector, U.S. Appl. No. 17/988,330, filed Nov. 16, 2022.

Yang et al., Electrical Connector, U.S. Appl. No. 18/075,246, filed Dec. 5, 2022.

Yang et al., Field Installable Card Edge Connector, U.S. Appl. No. 18/101,998, filed Jan. 26, 2023.

* cited by examiner

200

RELIABLE ELECTRICAL CONNECTOR WITH LATCH

RELATED APPLICATIONS

This application claims priority to and the benefit of Chinese Patent Application Serial No. 202122591708.7, filed on Oct. 27, 2021, entitled "ELECTRICAL CONNECTOR." The contents of this applications are incorporated herein by reference in their entirety.

TECHNICAL FIELD

The embodiments of the present disclosure relate to an electrical connector.

BACKGROUND

Electrical connectors are used in many electronic systems. It is generally easier and more cost effective to manufacture a system as several printed circuit boards (PCB) which may be joined together with electrical connectors than to manufacture the system as a single assembly. A known arrangement for interconnecting several PCBs is to have one PCB serve as a backplane. Other PCBs, which may be referred to as "daughter boards" or "daughter cards", are connected through the backplane.

SUMMARY

Aspects of the present disclosure relate to electrical connectors with improved reliability.

Some embodiments relate to a latch for a card edge connector. The card edge connector may include a housing having a slot elongating in a longitudinal direction. The latch may include a body comprising an upper portion and a lower portion narrower than the upper portion in a transverse direction perpendicular to the longitudinal direction; a projection extending from the lower portion of the body in the transverse direction; and a protrusion extending from lower portion between the projection and the upper portion of the body.

In some embodiments, the lower portion may have a first length in the longitudinal direction; and the protrusion may have a second length in the longitudinal direction, shorter than the first length.

In some embodiments, the protrusion may comprise a bottom portion adjacent the projection and a top portion adjacent the upper portion of the body; and the top portion may extend beyond the bottom portion in the transverse direction.

In some embodiments, the protrusion may comprise a bottom portion joining the projection and a top portion joining the upper portion of the body; and the top portion may extend beyond the bottom portion in the transverse direction.

In some embodiments, the protrusion may comprise an intermediate portion joining the bottom portion and the top portion; and the intermediate portion may be narrower than the top portion and the bottom portion in the longitudinal direction.

In some embodiments, the top portion may be flush with the upper portion of the body.

In some embodiments, a lower part of the projection may diminish in size in the transverse direction along a vertical direction perpendicular to the transverse direction and the longitudinal direction.

In some embodiments, the body may comprise a first side surface facing the slot of the connector and a second side surface opposite the first side surface and facing away from the slot of the connector; and the protrusion may be disposed closer to the first side surface than the second side surface.

In some embodiments, the protrusion may comprise a first end surface facing the slot of the connector and a second end surface opposite the first end surface and facing away from the slot of the connector; and the second end surface may curve toward the slot.

Some embodiments relate to an electrical connector. The electrical connector may include a housing comprising a slot elongated in a longitudinal direction; and a latch comprising a body and a projection extending in a transverse direction perpendicular to the longitudinal direction from a side surface of the body, the latch body pivotably connected to the housing by the projection such that the latch body is pivotable between a locked position and an unlocked position, and a protrusion extending from the projection towards an upper portion of the body so as to be disposed in a gap between the side surface of the body and the housing.

In some embodiments, the protrusion may include a bottom portion connected to the projection; and the projection may extend outwards from the body beyond the bottom portion in the transverse direction.

In some embodiments, the protrusion may comprise a top portion connected to the upper portion of the body; and the top portion may extend outwards from the body beyond the bottom portion in the transverse direction to form an upper projecting platform between the top portion and the bottom portion.

In some embodiments, the protrusion may comprise an intermediate portion between the top portion and the bottom portion; and the intermediate portion may have an outer surface smoothly connecting the top portion and the bottom portion.

In some embodiments, the intermediate portion may be narrower than the bottom portion and the top portion in the longitudinal direction.

In some embodiments, the housing may comprise a space configured to receive the latch; the space may comprise a side wall having a lower projecting platform; and the lower projecting platform may be disposed in a movement path of the upper projecting platform from the locked position to the unlocked position.

In some embodiments, the protrusion may comprise a first end surface facing the slot and a second end surface facing away from the slot; and the second end surface is adjacent to and/or abuts against a portion on the housing when the body of the latch is in the unlocked position.

Some embodiments relate to an electrical connector. The electrical connector may include a housing comprising a base extending in a longitudinal direction and a tower disposed at an end of the base and extending in a vertical direction perpendicular to the longitudinal direction; and a latch comprising a pair of projections pivotably disposed in the tower, a body extending in the vertical direction and rotatable about an axis connecting the pair of projections, and a pair of protrusions extending from respective projections of the pair and rotatably about the axis.

In some embodiments, the pair of protrusions may extend from respective projections towards respective sides of an upper portion of the body.

In some embodiments, the body of the latch may comprise an upper portion and a lower portion narrower than the upper portion in a transverse direction perpendicular to the longitudinal direction and the vertical direction; the pair of projections may extend from the lower portion of the body in the transverse direction; and the pair of protrusions may extend from respective projections of the pair to respective sides of the upper portion.

In some embodiments, the body of the latch may comprise a through hole extending from the upper portion to the lower portion in the vertical direction.

In some embodiments, the lower portion of the body may comprise a curved hook disposed in the base of the housing.

In some embodiments, the latch and the housing may comprise matching portions configured to engage with each other when the latch is in a locked position.

Some embodiments relate to an electrical connector. The electrical connector may comprise an insulating housing provided with a slot and a latch. The latch may include a latch body and a projection extending along a transverse direction from a side surface of the latch body. The latch body may be pivotably connected to the insulating housing by the projection between a locked position and an unlocked position. The latch may be used for locking a mated electronic element connected to the slot. The latch body may include a lower body and an upper body, the lower body may be narrower than the upper body in the transverse direction, and the projection may be provided on the lower body. The latch may further include a protrusion provided on the lower body, and the protrusion may extend from the projection towards the upper body and abut against the insulating housing in the transverse direction.

In some embodiments, the protrusion may include a bottom portion connected to the projection, and the projection extends outwards from the latch body beyond the bottom portion in the transverse direction.

In some embodiments, the protrusion may further include a top portion connected to the upper body, the top portion may extend outwards from the latch body beyond the bottom portion in the transverse direction to form a projecting platform between the top portion and the bottom portion.

In some embodiments, an intermediate portion may connect between the top portion and the bottom portion, and the intermediate portion may have an outer surface smoothly connecting between the top portion and the bottom portion.

In some embodiments, the intermediate portion may be narrower than the bottom portion and the top portion in a longitudinal direction perpendicular to the transverse direction.

In some embodiments, the top portion may extend outwards along the transverse direction from the latch body to be flush with the upper body.

In some embodiments, the insulating housing may be provided with a latch mounting slot, the latch may be pivotably mounted to the latch mounting slot, a side wall of the latch mounting slot may be provided with a lower projecting platform situated on a downward moving path of the upper projecting platform, there may be a gap between the lower projecting platform and the upper projecting platform, and the gap may be configured to be small enough to only allow the latch to be pivoted between the locked position and the unlocked position.

In some embodiments, the side surface may have a first side facing the slot and a second side facing away from the slot, and the protrusion may be closer to the first side than the second side.

In some embodiments, along a longitudinal direction perpendicular to the transverse direction, the protrusion may include a first end surface facing the slot and a second end surface facing away from the slot, the second end surface may abut against a limit portion on the insulating housing when the latch body is pivoted outward to the unlocked position.

In some embodiments, the second end surface may be provided with a limit groove, the limit groove may abut against the limit portion when the latch body is situated at the unlocked position.

In some embodiments, along the transverse direction, a lower part of the projection may have a diminishing size along a downward direction.

In some embodiments, the insulating housing may include a base extending along the longitudinal direction and a tower protruding upward from an end of the base, and the latch body may be pivotably connected to the tower.

In some embodiments, the projection may include a first projection and a second projection, the first projection and the second projection may be respectively provided on the two sides of the latch body opposite to each other along the transverse direction; wherein the protrusion may include a first protrusion portion and a second protrusion portion, the first protrusion portion may extend from the first projection towards the upper body, and the second protrusion portion may extend from the second projection towards the upper body.

In some embodiments, the side surface may be provided with an engaging portion, the engaging portion may be situated at the upper body, the insulating housing may be provided with an engaging portion matching the engaging portion of the latch, and the engaging portion of the latch is engaged to or released from the engaging portions of the housing under an external force.

In some embodiments, the engaging portion of the latch is a protrusion, and the engaging portion of the housing is an engaging groove.

In some embodiments, the latch body may be provided with a through hole, the through hole may penetrate the latch body along a longitudinal direction perpendicular to the transverse direction.

In some embodiments, the through hole may extend from the upper body to the lower body.

In some embodiments, a lower end of the latch body may include a curved hook facing the slot, and the lower end of the latch body may abut against the insulating housing when the latch body is situated at the unlocked position.

These techniques may be used alone or in any suitable combination. The foregoing summary is provided by way of illustration and is not intended to be limiting.

BRIEF DESCRIPTION OF DRAWINGS

The accompanying drawings may not be drawn to scale. In the drawings, each identical or nearly identical component that is illustrated in various figures is represented by a like numeral. For purposes of clarity, not every component may be labeled in every drawing. In the drawings.

Figure 1:
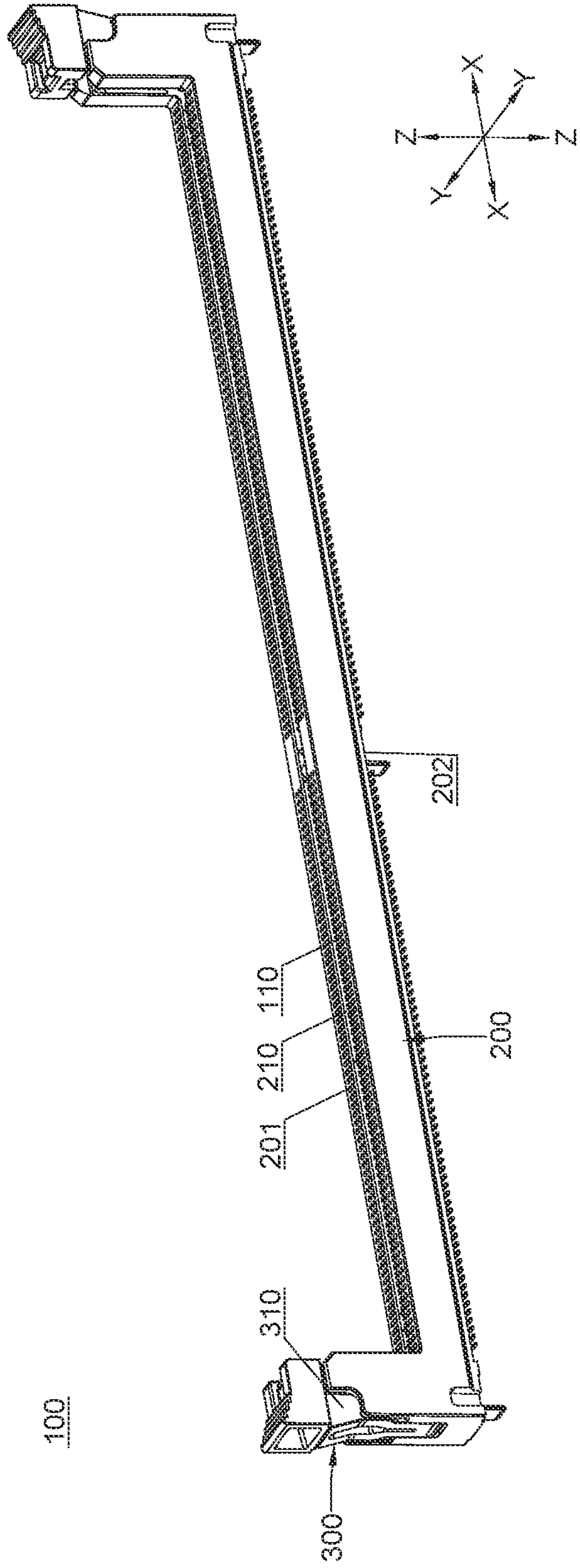
FIG. 1 is a perspective view of an electrical connector according to an exemplary embodiment of the present disclosure, wherein the latch body is in the locked position.

The above accompanying drawings include the following reference signs:

100-electrical connector; 110-conductor; 200-insulating housing; 201-mating surface; 202-mounting surface; 210-receiving portion; 230-limit portion; 240-latch mounting slot; 241, 242-side wall; 243-end wall; 244-lower projecting platform; 251-base; 252-tower; 260-engaging portion; 270-projection receiver; 300, 300'-latch; 310-latch body; 311-lower body; 312-upper body; 3120-locking portion; 313-lower end; 314-upper end; 320-projection; 321-first projection; 322-second projection; 330-side surface; 331-first side; 332-second side; 340-engaging portion; 350-through hole; 360-operation portion; 400-protrusion; 411-bottom portion; 412-top portion; 413-intermediate portion; 414-upper projecting platform; 421-first end surface; 422-second end surface; 430-limit groove; 441-first protrusion portion; and 442-second protrusion portion.

DETAILED DESCRIPTION

The Inventors have recognized and appreciated design techniques to enable more reliable connectors. The Inventors have recognized and appreciated that conventional connectors may have latches that may move with respective to connector housings during mounting and mating, and/or in use, which may cause unreliable connections between components meant to be connected through the connectors. For example, a card edge connector is an example of a connector used for interconnection of printed circuit boards of an electronic system. A double data rate synchronous dynamic random access memory (DDR SDRAM) is an example of a memory used in computers. The DDR SDRAM may be interconnected to a mainboard of a computer through a card edge connector. The card edge connector may be mounted to the mainboard, and conductors of the card edge connector may be connected to circuits on the mainboard. A memory card may be inserted into the card edge connector. The card edge connector may include a latch configured to lock the memory card with the card edge connector. Any movement of the latch may lead to movement of the memory card and therefore unreliable connection between the memory card and the mainboard.

The inventors have recognized and appreciated features that prevent undesirable relative movements between components of connectors. A connector may have a housing with a base extending in a longitudinal direction and towers disposed on opposite ends of the base. Latches may be pivotably disposed in the towers so that the latches may move between a locked position for locking a mating component, such as a memory card, with the connector and an unlocked position for releasing the mating component from the connector. Each latch may have a body extending in a vertical direction and projections extending from opposite sides of the body in a transverse direction so as to be pivotably disposed in matching receivers of a respective tower. The body of the latch may rotate between the locked position and the unlocked position about an axis connecting the projections. The body of the latch may have an upper portion and a lower portion that may be narrower than the upper portion in the transverse direction such that the projections may extend from the lower portion without requiring enlarging the tower in the transverse direction. Gaps, however, may exist between the latch and the housing and give space for undesired movements of the latch.

The latches may include features configured to prevent such undesired movements. Each latch may include protrusions configured to fill the gaps at least partially while still allowing the latches to move between the locked and unlocked positions. Each protrusion may have a bottom portion joining a respective projection and a top portion joining the upper portion of the body. The top portion may extend beyond the bottom portion in the transverse direction so as to prevent the latch from undesired movements in the transverse direction yet allow the movement between the locked and unlocked positions. The protrusion may be disposed closer to an inside of the tower and have a surface facing away the inside of the tower yet curving towards the inside of the tower so as to prevent the latch from undesired movements in the longitudinal direction yet allow the movement between the locked and unlocked positions. Each protrusion may include an intermediate portion joining the bottom portion and the top portion. The intermediate portion may be disposed adjacent a projecting platform of the tower so as to prevent the latch from undesired movements in the vertical direction due to, for example, a force generated during inserting a card or mounting the connector to a board, yet allow the movement between the locked and unlocked positions.

Figure 2:
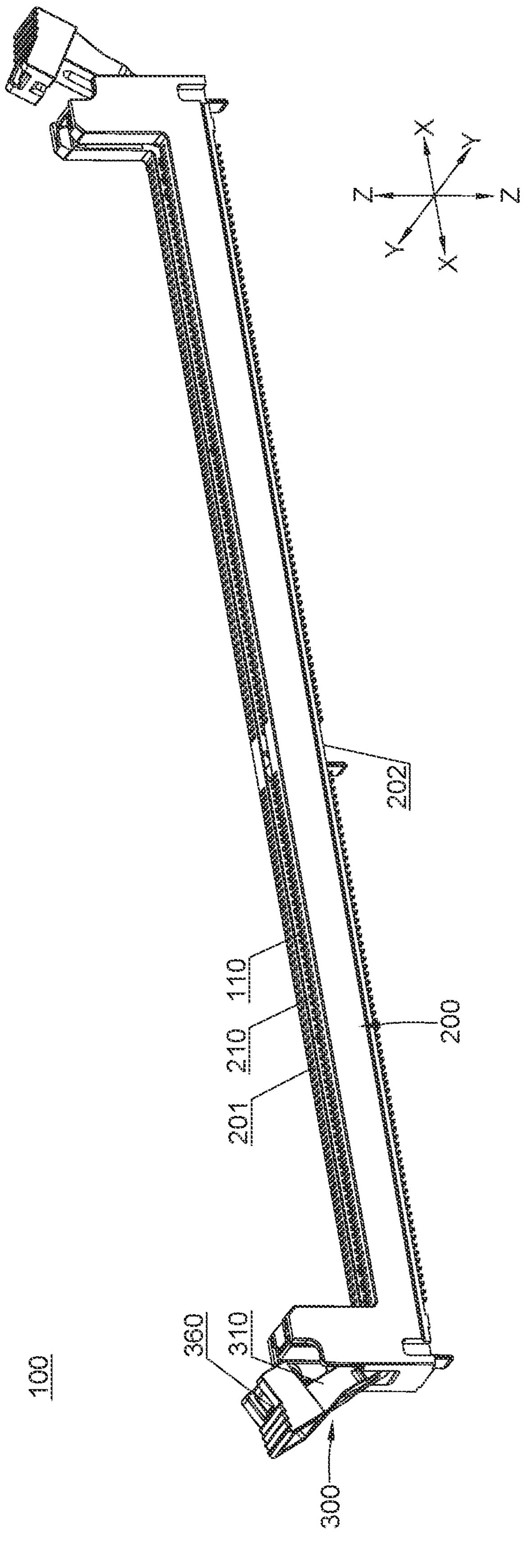
FIG. 2 is a perspective view of the electrical connector shown in FIG. 1, wherein the latch body is in the unlocked position.
Figure 3:
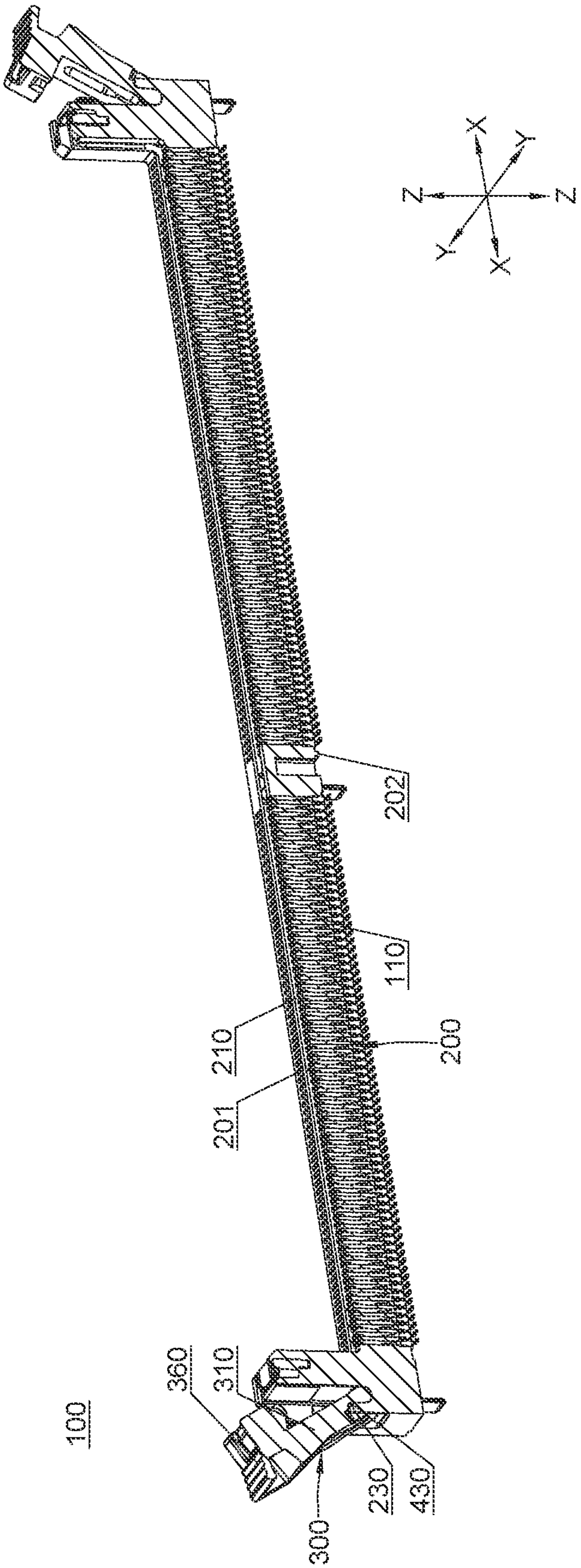
FIG. 3 is a sectional perspective view of the electrical connector shown in FIG. 2.
Figure 4:
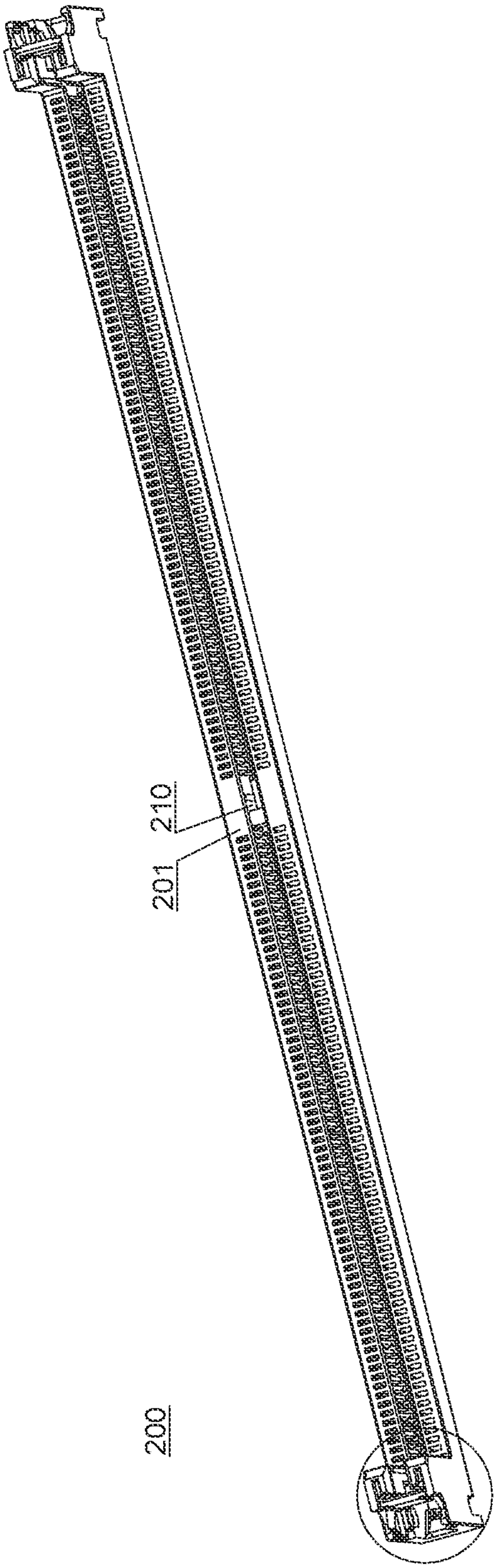
FIG. 4 is a top perspective view of an insulating housing of the electrical connector of FIG. 1.

Such techniques may be integrated into an electrical connector 100. As shown in FIGS. 1 to 3, the electrical connector 100 may include an insulating housing 200 and a latch 300. For clear and concise description, a vertical direction Z-Z, a longitudinal direction X-X and a transverse direction Y-Y may be defined. The vertical direction Z-Z, the longitudinal direction X-X and the transverse direction Y-Y may be perpendicular to one another. The vertical direction Z-Z may refer to a height direction of the electrical connector 100. The longitudinal direction X-X may refer to a length direction of the electrical connector 100. The transverse direction Y-Y may refer to a width direction of the electrical connector 100.

The insulating housing 200 may have a mating surface 201 and a mounting surface 202 which may be opposite to each other in the vertical direction Z-Z. The mating surface 201 may be provided with a slot 210. The slot 210 may have any suitable structure. In some embodiments, the slot 210 may be recessed inwards in the vertical direction Z-Z from the mating surface 201, to form a card slot. The slot 210 may be configured to receive a mating electronic element. The mating electronic element may include, but not limited to, an electronic card. The electronic card may comprise one or more of a display card, a memory card, a sound card and the like. If possible, the mated electrical element may further include a mated electrical connector. For example, when the electrical connector 100 is a receptacle electrical connector, the mated electrical connector may be a plug electrical connector. The principle of the present disclosure is described below with an example of the mating electronic element being an electronic card.

In some embodiments, the insulating housing 200 may have a longitudinal strip shape. The insulating housing 200 may extend in the longitudinal direction X-X. The slot 210 may be a long and thin card slot extending in the longitudinal direction X-X. The edge of the electronic card may be inserted into the card slot. The mounting surface 202 may face an element like a printed circuit board. The electronic card may be engaged to the slot 210 of the mating surface 201, and the mounting surface 202 may be connected to a printed circuit board configured as a backplane. In this way, the electronic card may be electrically connected to the printed circuit board through the electrical connector 100, and circuits on the electronic card and circuits on the printed circuit board may be interconnected.

In some embodiments, as shown in FIGS. 3 to 7, the insulating housing 200 may include a base 251 and a tower 252. The base 251 may extend in the longitudinal direction X-X. The tower 252 may extend in the vertical direction Z-Z to protrude upward from an end of the base 251. Orientation terms may be used herein under the placement of the electrical connector 100 shown in FIGS. 1 to 2, i.e., a side on which the mating surface 201 may be located may be an upper side and a side on which the opposite mounting surface 202 may be located may be a lower side. Optionally, the receiving portion 210 in form of a card slot may be extend in the insulating housing 200 in the longitudinal direction X-X, and may extend, in the longitudinal direction X-X, into the tower 252 from the base 251. The tower 252 may improve a connection strength of the electrical card inserted into the receiving portion 210. The insulating housing 200 may be molded of an insulating material, for example, plastic. The insulating housing 200 may be an integral member.

The base 251 may be provided with a plurality of conductors 110. The plurality of conductors 110 may be spaced from each other in the longitudinal direction X-X to ensure mutual electric insulation of adjacent conductors 110. Front ends of the plurality of conductors 110 may extend to the receiving portion 210. In this manner, when the electrical card is engaged with the receiving portion 210, the front ends of the conductors 110 may be electrically coupled with the conductors (e.g., golden fingers) on the electrical card. Rear ends of the plurality of conductors 110 may extend beyond the back surface (mounting surface) of the base 251. When the electrical connector 100 is installed on the printed circuit board (not shown), the plurality of conductors 110 may be electrically coupled with the circuits on the printed circuit board.

Figure 11:
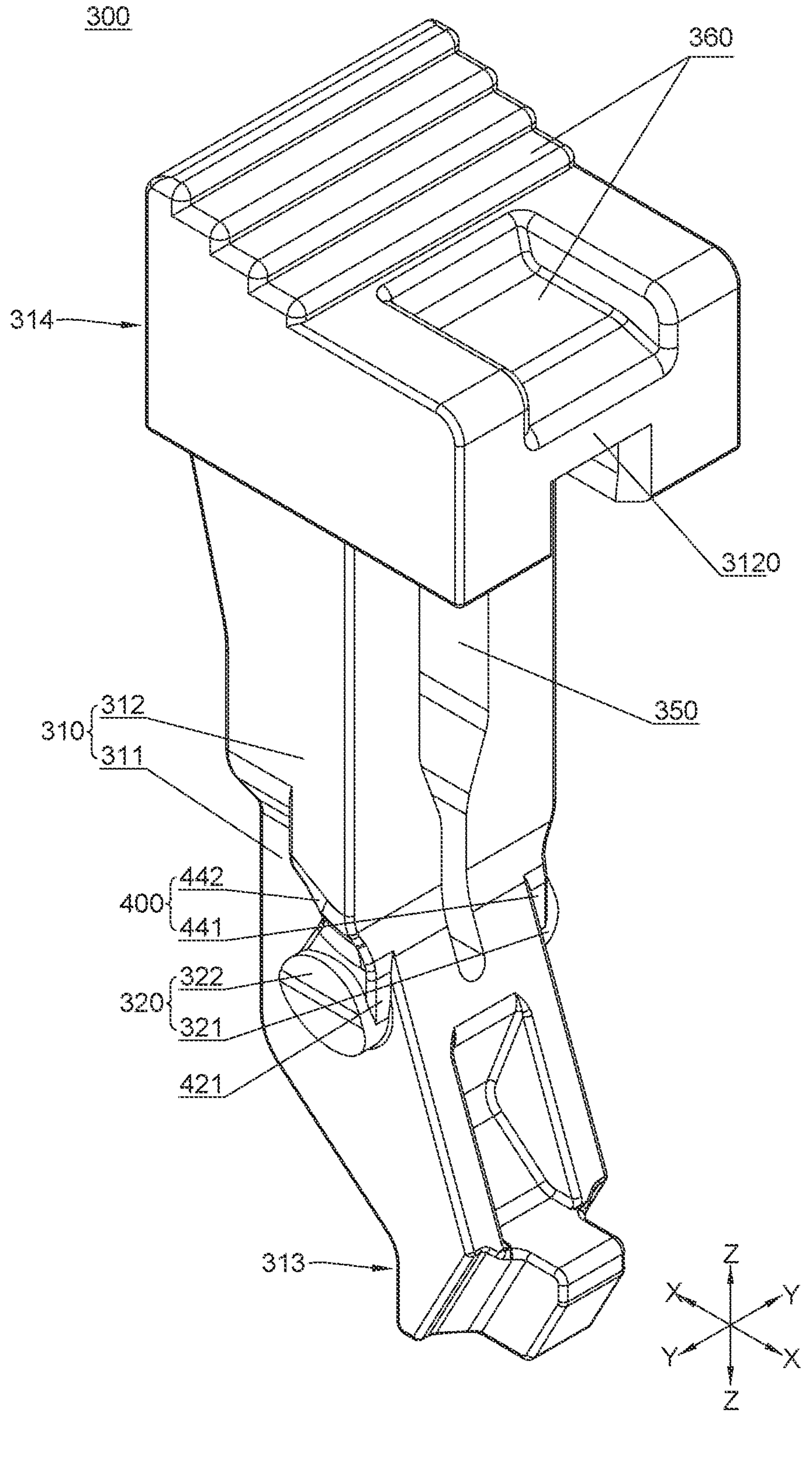
FIG. 11 is a perspective view of the latch shown in FIG. 8, showing a surface of the latch facing a slot of the electrical connector of FIG. 1.

The latch 300 may be pivotably connected to an end of the insulating housing 200. The latch 300 may be pivotably connected to the tower 252. The latch 300 may be used for locking the electronic card connected to the receiving portion 210. The edge portion, with the notch provide thereon, of the electronic card may be inserted into the tower 252, and a locking portion 3120 (as shown in FIG. 11) at the top of the latch 300 may protrude into the notch when the latch 300 is locked to the tower 252 such that the edge of the notch may be stuck in the locking portion 3120. In some embodiments, the insulating housing may include a tower that does not bulge significantly. However, it should be appreciated that the latch 300 may be installed to the insulating housing by means of suitable variants. The insulating housing 200 may include the tower 252. The lower portion of the side edge of the electrical card may be inserted into the insulating housing 200 to make the firmer connection between the electronic card and the electrical connector 100. The tower 252 may further provide a mounting space for the latch 300. In the embodiments shown in FIGS. 1 to 2, in the longitudinal direction X-X, a pair of latches 300 may be disposed at outer ends of a pair of towers 252 respectively.

Figure 5:
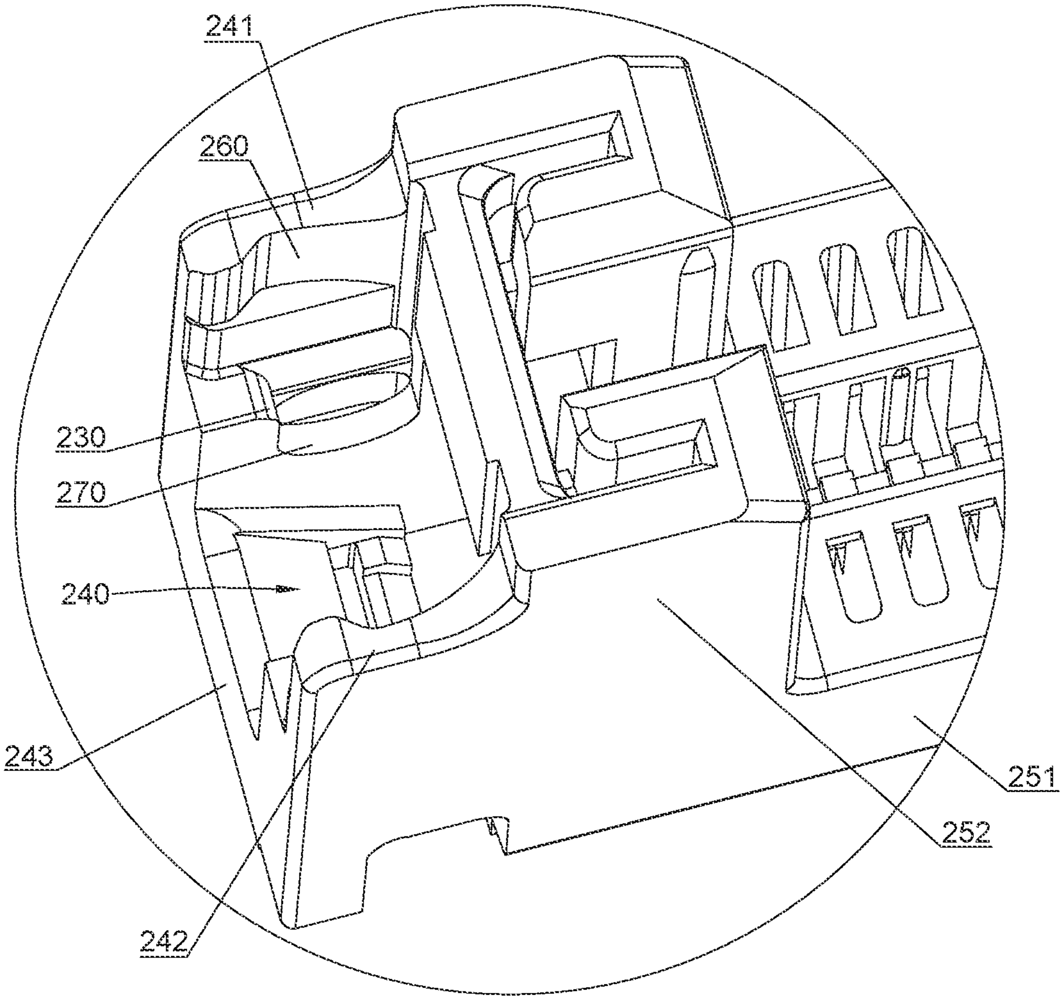
FIG. 5 is an enlarged view of a portion of the insulating housing circled in FIG. 4.
Figure 6:
FIG. 6 is a side perspective view of the insulating housing shown in FIG. 4.
Figure 7:
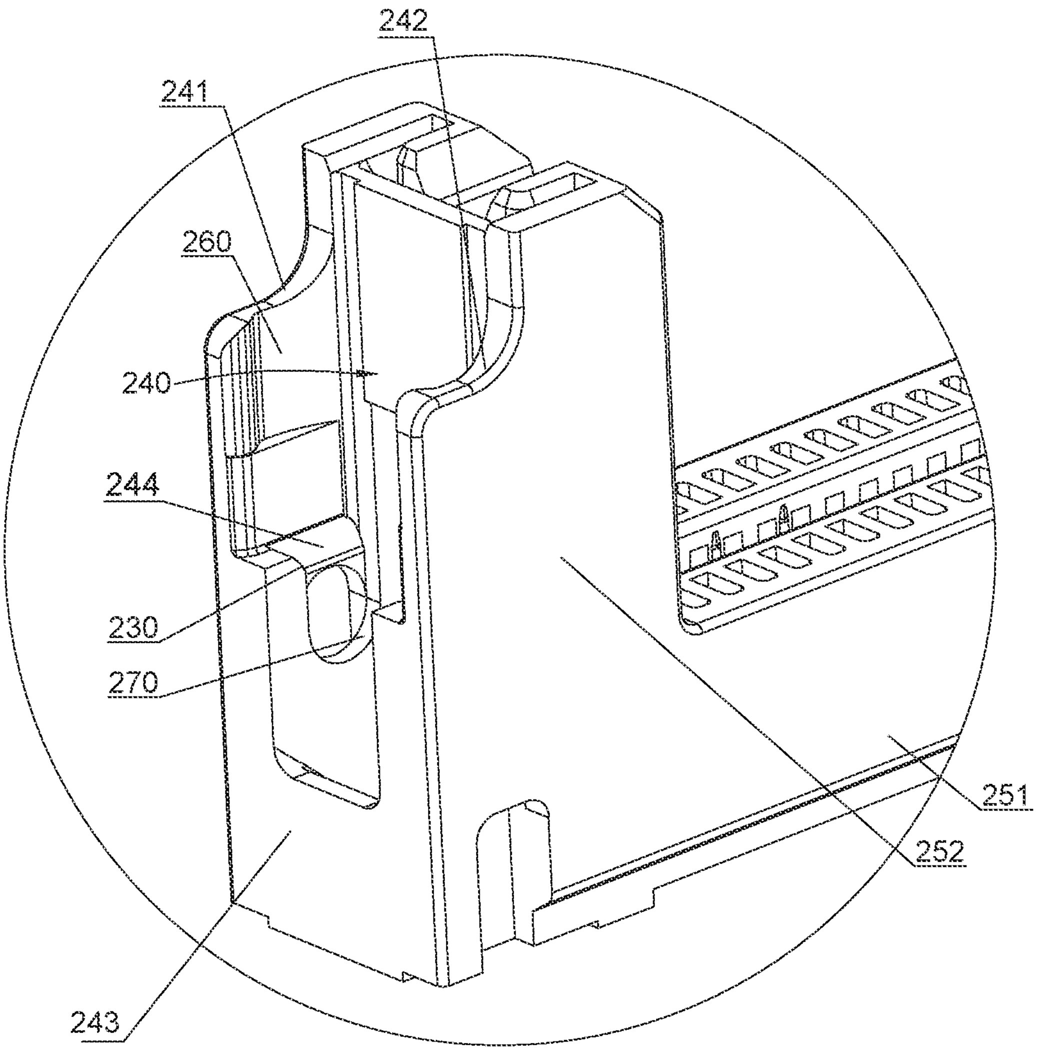
FIG. 7 is an enlarged view of a portion of the insulating housing circled in FIG. 6.

As shown in FIGS. 8 to 11, the latch 300 may include a latch body 310, a projection 320 and a protrusion 400. The projection 320 may extend, in the transverse direction Y-Y, from a side surface 330 of the latch body 310. Projections 320 may be disposed on each of the side surface 330 of the latch body 310 and on the other side surface opposed to the side surface 330. The projection 320 protrudes from the side surface 330 of the latch body 310 in the transverse direction Y-Y. The latch body 310 may be pivotably connected, enabling latch body 310 to pivot between a locked position and an unlocked position, to the insulating housing 200 by the projection 320. The projection 320 may be configured as a pivot for connecting the latch body 310 and the insulating housing 200. When the latch body 310 is located at the locked position, the electronic card may be locked by the latch body 310 in the receiving portion 210. When the latch body 310 is located at the locked position, the electronic card may be unlocked by pivoting the latch body 310 to the unlocked position such that the electrical card can be taken out of the receiving portion 210. It should be appreciated that the insulating housing 200 may be provided with a projection receiver 270, as shown in FIGS. 5 and 7, to match the projection 320, so that the latch body 310 may be pivotably connected, between the locked position and the unlocked position, to the insulating housing 200. The projection receiver 270 may be a shaft hole or groove which may be disposed in the insulating housing 200. The projection 320 may extend into the projection receiver 270. The projection receiver 270 may have any structure capable of matching the projection 320 to enable the latch body 310 to be pivoted relative to the insulating housing 200.

In some embodiments, an upper end 314 of the latch body 310 may be provided with an operation portion 360, as shown in FIG. 11. The operation portion 360 may include one or more of anti-slip stripes and grooves. The operation portion 360 may make it convenient for users to pivot the latch body 310 between the locked position and the unlocked position, especially pivoting to the unlocked position.

Figure 9:
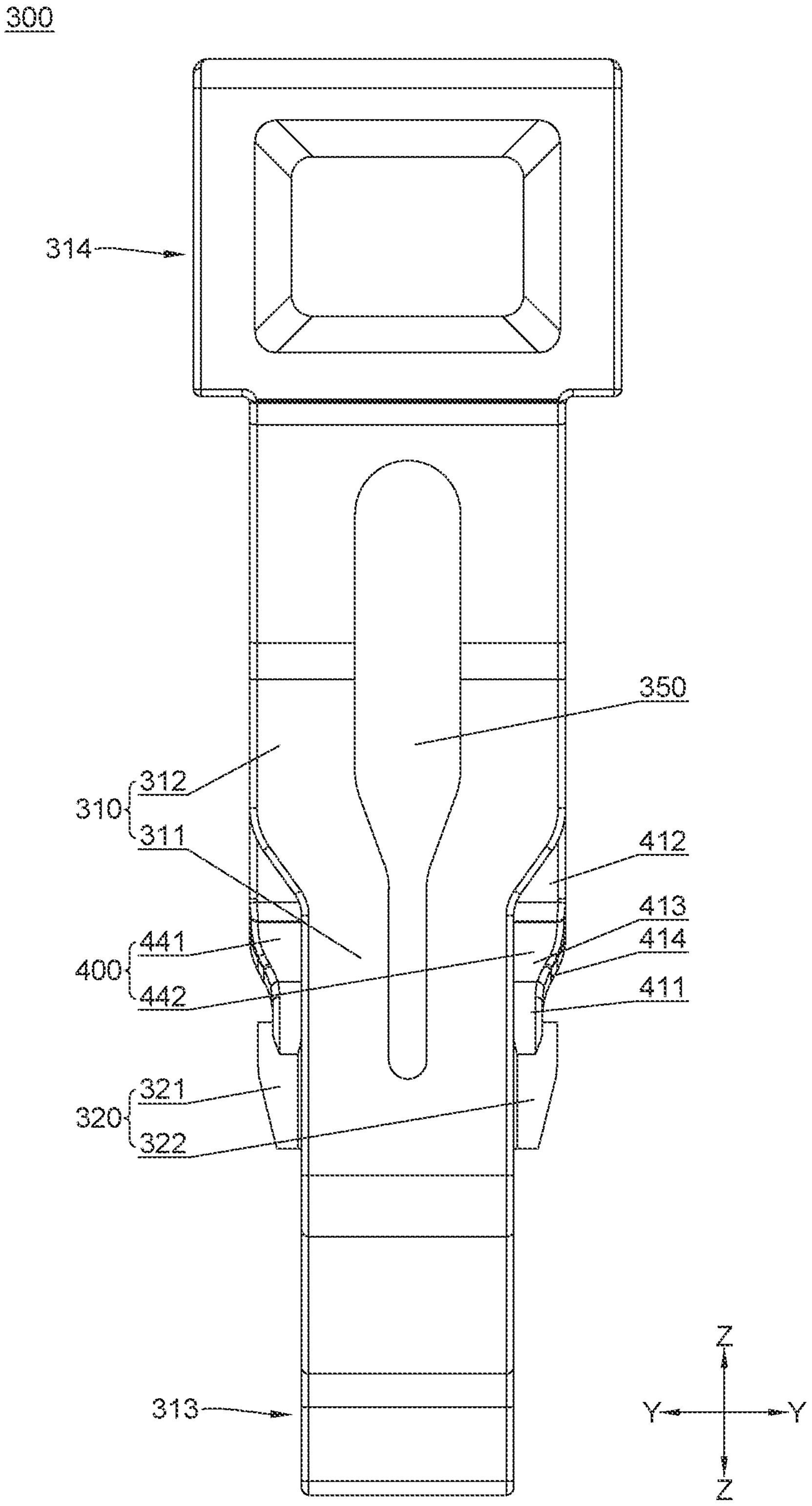
FIG. 9 is a side view of the latch shown in FIG. 8, showing a side of the latch facing a slot of the electrical connector of FIG. 1.

The latch body 310 may include a lower body 311 and an upper body 312. In the transverse direction Y-Y, the lower body 311 may be narrower than the upper body 312, as shown in FIG. 9. In this manner, in the transverse direction Y-Y, an installation space may be formed on both sides of the lower body 311 for the projection 320 and the projection receiver 270. The projection 320 may be disposed on the lower body 311. In the vertical direction Z-Z, the projection 320 may be spaced apart from the upper body 312 to avoid an interference between the upper body 312 and the insulating housing 200 in the process of pivoting of the latch body 310. The latch body 310 may be pivotably connected into a latch mounting slot 240 in the tower 252, as shown in FIGS. 5 and 7. In the transverse direction Y-Y, the width of the upper body 312 matches with that of an upper portion of the latch mounting slot 240. When the latch body 310 may be located at the locked position, the upper body 312 may be clamped by two side walls 241 and 242 of the latch mounting slot 240. In this manner, the latch 300 locked to the insulating housing 200 may have good stability, and the vibration of the latch 300 in the insulating housing 200 may be reduced.

The protrusion 400 may be disposed on the lower body 311. The protrusion 400 may extend, from the projection 320, towards the upper body 312. In some embodiments, in the longitudinal direction X-X, the size of the protrusion 400 may be generally no bigger than that of the projection 320. In the longitudinal direction X-X, the size of the protrusion 400 may be slightly bigger than that of the projection 320. Either of the above cases may be selected as long as the protrusion 400 does not interfere with the insulating housing 200 when the latch body 310 is pivoted between the locked position and the unlocked position. In some embodiments, as for the latch body 310 in the locked position, in the direction towards the longitudinal end of the insulating housing 200, the protrusion 400 may not extend beyond the projection 320. This may be mainly to avoid the interference with the insulating housing 200. An end wall 243 of the tower 252 may be provided with an opening. The latch mounting slot 240 may be enclosed and formed by the end wall 243 and the side walls 241 and 242. The upper body 312 may be pivoted to the outside of the insulating housing 200 in the longitudinal direction through the opening until the latch body 310 reaches the unlocked position, and accordingly, the locking portion 3120 on the upper body 312 configured to be locked with the electronic card may exit from the notch of the electronic card to leave an operation space for pulling out the electronic card from the electrical connector 100. The protrusion 400 may be configured to have no interference with the end wall 243 in the process of the latch body 310 pivoting from the locked position to the unlocked position. Therefore, the protrusion 400 may be disposed closer to a longitudinal inner side of the lower body 311.

The protrusion 400 may be adjacent and/or abut against the insulating housing 200 in the transverse direction Y-Y, and may be adjacent and/or abut against the side walls of the latch mounting slot 240. This may facilitate locking the latch 300 in the insulating housing 200. The protrusion 400 may stabilize the position of the electronic card relative to the electrical connector 100 by stabilizing the position of the latch 300 in the insulating housing 200. The latch 300 may be prevented from vibrating in the insulating housing 200 in use, so that the electronic card may be stably held on the electrical connector 100. The protrusion 400 may be also connected to the projection 320, which may reinforce the mechanical strength of the projection 320. In this way, the latch 300 may be firmer and more durable.

The lower body 311 of the latch 300 may be provided with the protrusion 400, such that the protrusion 400 and the insulating housing 200 may be adjacent to and/or abut against each other when the latch 300 is locked to the insulating housing 200. In this manner, the latch 300 may not shake and have high stability, such that the electronic card held in the receiving portion 210 may have a relatively high stability, and the electrical connector 100 may have stable mechanical and electrical performances. The protrusion 400 may reinforce the mechanical strength of the projection 320, which may make the latch 300 firmer and more durable.

In some embodiments, in the transverse direction Y-Y, both sides of the latch body 310 may be provided with the projections 320 to improve the pivoting stability. As shown in FIGS. 8 to 11, the projections 320 may include a first projection 321 and a second projection 322. The first projection 321 and the second projection 322 may be disposed on two side surfaces of the latch body 310 opposed to each other in the transverse direction Y-Y respectively. The side wall 241 of the insulating housing 200 may be provided with a first projection receiver matching the first projection 321, and the side wall 242 of the insulating housing 200 may be provided with a second projection receiver matching the second projection 322. As described above, the first projection receiver and the second projection receiver may be shaft holes or grooves. The protrusion 400 may include a first protrusion portion 441 and a second protrusion portion 442. The first protrusion portion 441 may extend, from the first projection 321, towards the upper body 312. The second protrusion portion 442 may extend, from the second projection 322, towards the upper body 312. The first protrusion portion 441 and the second protrusion portion 442 may be disposed on two sides of the latch body 310 opposed to each other in the transverse direction Y-Y respectively. The structures of the first protrusion portion 441 and the second protrusion portion 442 may be mirror images. Alternatively, the first protrusion portion 441 and the second protrusion portion 442 may have different structures. The first protrusion portion 441 and the second protrusion portion 442 may be adjacent to and/or abut against the insulating housing 200, when the latch 300 is locked to the insulating housing 200. Providing both sides with the protrusions may bring benefits. When the latch 300 is locked to the insulating housing 200, the first protrusion portion 441 and the second protrusion portion 442 may be adjacent to and/or abut against the side walls 241 and 242 respectively. Therefore, the lower body 311 may be clamped between the side walls 241 and 242 by the first protrusion portion 441 and the second protrusion portion 442 to obtain a better stability.

Although both sides of the latch body 310 may be provided with the projections 320, the protrusion 400 may be provided on a single side. Providing a single side of the latch body 310 with the protrusion 400 may not be so good in improving the stability as the embodiments where the two sides of the latch body 310 may be provided with the protrusions 400, but still provide benefits over conventional connectors.

Figure 8:
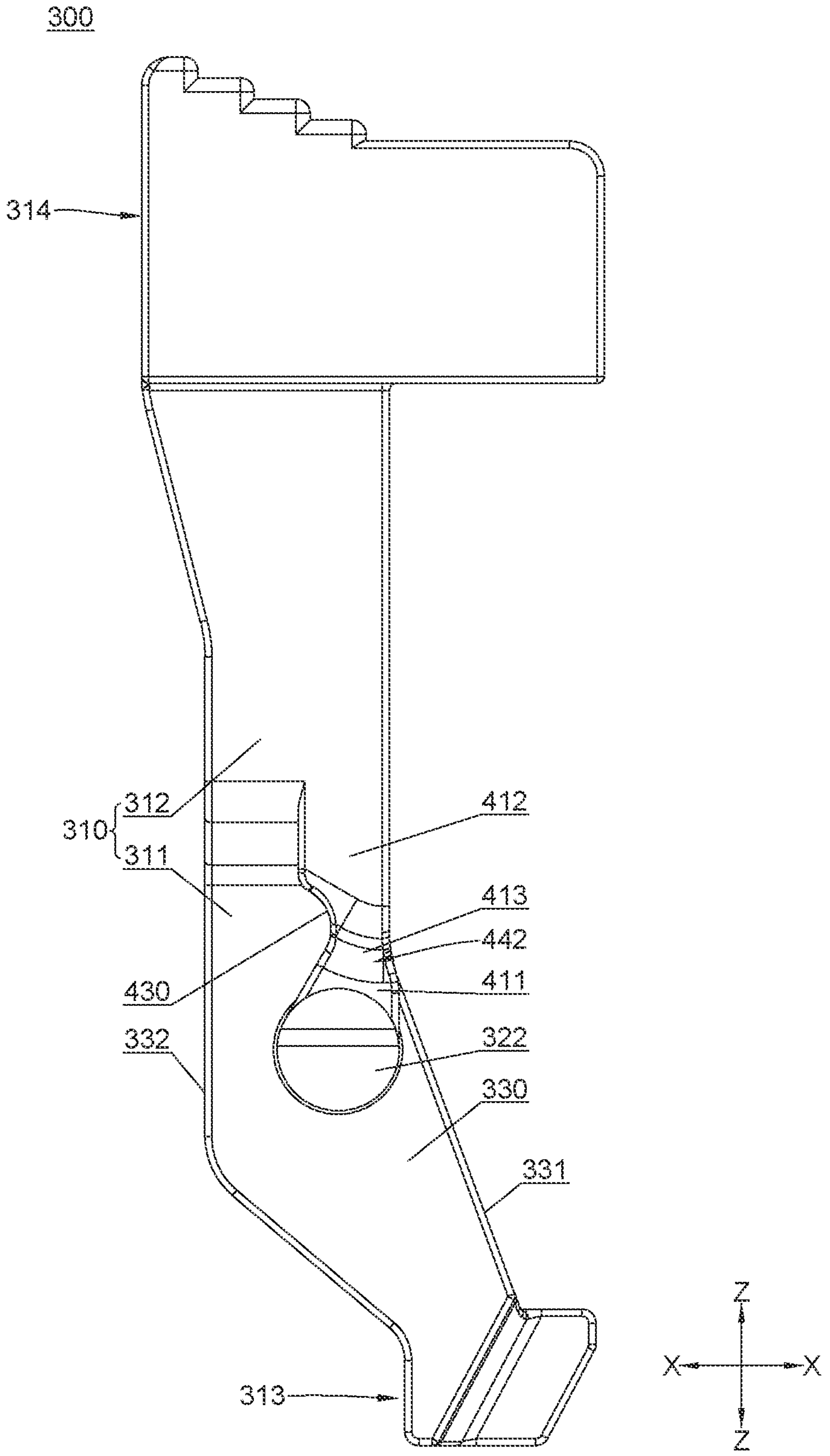
FIG. 8 is a side view of a latch of the electrical connector of FIG. 1.
Figure 10:
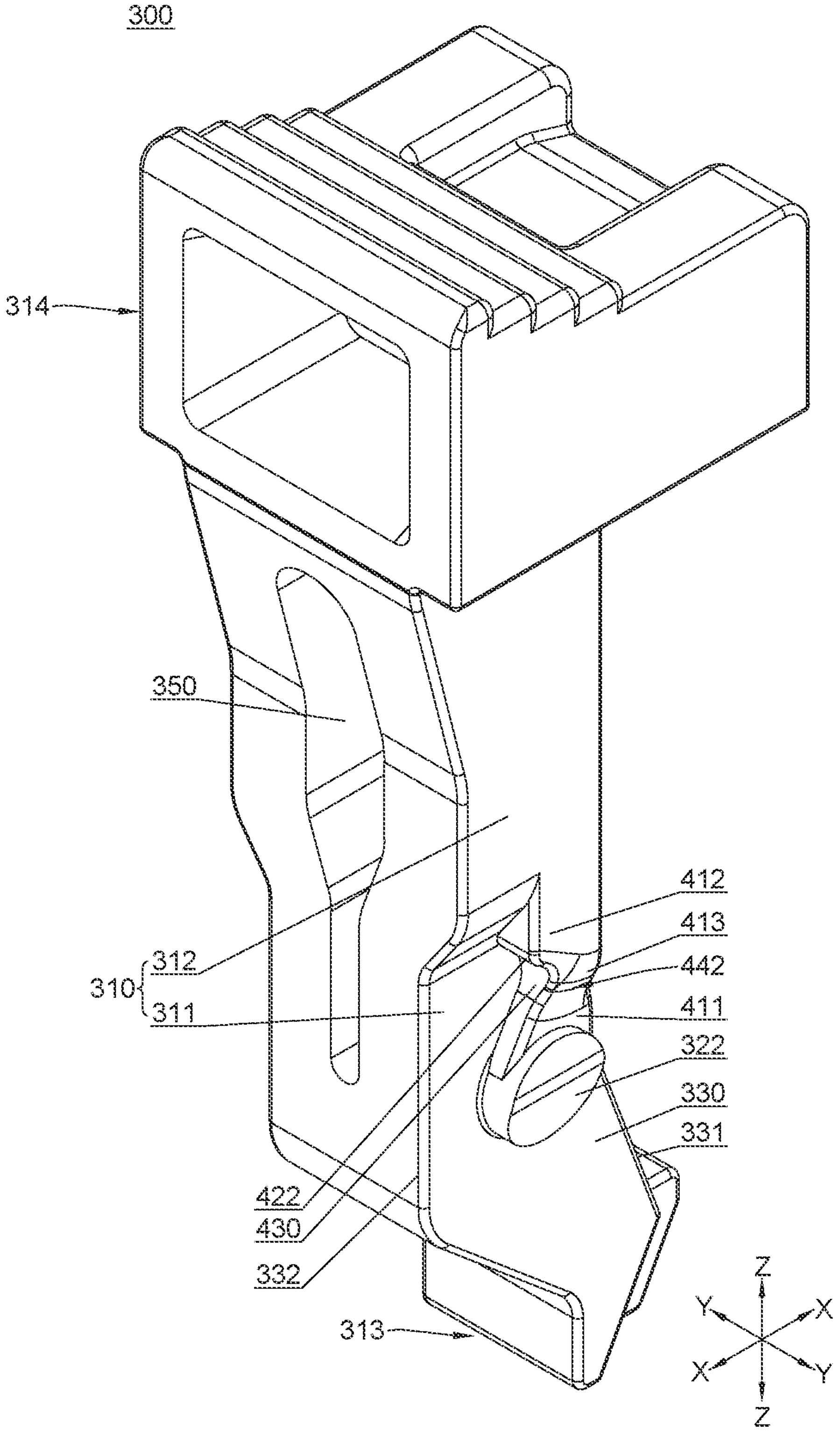
FIG. 10 is a perspective view of the latch shown in FIG. 8, showing a surface of the latch facing away from a slot of the electrical connector of FIG. 1.

To further describe the structure of the protrusion 400 in details, the protrusion 400 will now be divided into a plurality of parts for purposes of discussion. As shown in FIGS. 8-10, the protrusion 400 may include a bottom portion 411. The bottom portion 411 may be connected to the projection 320. In the transverse direction Y-Y, the projection 320 may extend outwards from the latch body 310 to exceed the bottom portion 411. In this manner, the projection 320 may protrude from structures therearound and be inserted into the projection receiver 270 in form of a shaft hole to enable the matching between the projection 320 and the projection receiver 270 to be firmer, so that the electrical connector 100 can be firmer and more durable.

Further, as shown in FIGS. 8 to 10, the protrusion 400 may further include a top portion 412. The top portion 412 may be connected to the upper body 312. The protrusion 400 may be connected between the upper body 312 and the projection 320, which may enable the latch body 310 to have stronger mechanical strength. In other embodiments which may be not illustrated, the protrusion 400 may further be disposed with a spacing from the upper body 312. In the transverse direction Y-Y, the top portion 412 may extend outwards from the latch body 310 to exceed the bottom portion 411. Therefore, a projecting platform 414 may be formed between the top portion 412 and the bottom portion 411, as shown in FIG. 9. The top portion 412 may be adjacent to and/or abut against the insulating housing 200 in the transverse direction Y-Y. For example, the top portion 412 may be adjacent to and/or abut against the side wall of the latch mounting slot 240. Although the top portion 412 exceeds the bottom portion 411 in the transverse direction Y-Y, the bottom portion 411 may be adjacent to and/or abut against the insulating housing 200 in the transverse direction Y-Y by reasonable design of the side wall of the latch mounting slot 240, which therefore may bring a better stability effect.

Also referring to FIG. 7, the side wall of the latch mounting slot 240 may be provided with a projecting platform 244. The projecting platform 244 may be situated on a downward moving path of the projecting platform 414. When the latch 300 bears a downward pressing force and the projecting platform 414 moves downward to the position where the projecting platform 244 may be located, the projecting platform 244 may prevent the projecting platform 414 from continuing to move downward, so that the force applied to the projection 320 may be shared. When the latch 300 may be installed in place on the insulating housing 200, there may be a gap between the projecting platform 244 and the projecting platform 414. The gap may be configured to be small enough to only allow the latch 300 to pivot between the locked position and the unlocked position.

When a downward pressing force is applied to the latch 300, for example, when the latch 300 is installed downward, the protrusion 400 may be configured to support the projection 320, so as to prevent any damage to the projection 320 by, for example, excessive force.

In some embodiments, in the transverse direction Y-Y, the top portion 412 may extend outwards from the latch body 310 to be flush with the upper body 312. In some embodiments, in the transverse direction Y-Y, an outer surface of the top portion 412 may be flush with an outer surface of the upper body 312, as shown in FIG. 9. In this manner, the latch 300 may have a relatively small size and a compact structure, so as to achieve miniaturization of the electrical connector 100.

As shown in FIGS. 8 to 10, the protrusion 400 may include an intermediate portion 413. The intermediate portion 413 may be between the top portion 412 and the bottom portion 411. The intermediate portion 413 may have an outer surface smoothly connected between the top portion 412 and the bottom portion 411. The smooth projecting platform 414 may be formed on the intermediate portion 413. The projecting platform 244 may have a structure mated to the projecting platform 414. The intermediate portion 413 may make the outer surface of the protrusion 400 smoother, so that a friction resistance of pivoting may be smaller, and user experience may be better. This latch 300 may be easy to manufacture.

Alternatively, the top portion 412 and the bottom portion 411 may not be connected by a smooth curved surface, and the projecting platform 414 may be a step having a corner. Correspondingly, the projecting platform 244 may also be a step having a corner.

As shown in FIG. 8, in the longitudinal direction X-X, the intermediate portion 413 may be narrower than the bottom portion 411 and the top portion 412. In this manner, a groove may be formed by the intermediate portion 413, the bottom portion 411 and the top portion 412. The groove may function as a limit groove 430 (described below).

In some embodiments, as shown in FIG. 8, the side surface 330 of the latch body 310 may have a first side 331 and a second side 332. The first side 331 may face the receiving portion 210, with reference to FIGS. 1 to 3. The second side 332 may face away from the receiving portion 210. The protrusion 400 may be closer to the first side 331, relative to the second side 332. The protrusion 400 may be closer to the receiving portion 210. In this manner, even though the latch body 310 may be pivoted to the unlocked position (as shown in FIG. 2), the protrusion 400 may not have the interference with the tower 252, and the protrusion 400 can nearly be in the tower 252 all the time. Therefore, the latch 300 may also have a relatively good stability during pivoting.

In some embodiments, as shown in FIGS. 10 to 11, in the longitudinal direction X-X, the protrusion 400 may include a first end surface 421 and a second end surface 422. The first end surface 421 may face the receiving portion 210. The second end surface 422 may face away from the slot 210. The insulating housing 200 may be provided with a limit portion 230. The second end surface 422 may be adjacent to and/or abut against the limit portion 230 on the insulating housing 200 when the latch body 310 may be pivoted outwards to the unlocked position. The limit portion 230 may include a stopper, a shutter, and the like. In this way, the latch body 310 may be prevented from damage due to, for example, excessive pivoting.

The second end surface 422 may be provided with the limit groove 430. The limit groove 430 may be adjacent to and/or abut against the limit portion 230 when the latch body 310 is located at the unlocked position. The limit groove 430 may be formed by having the intermediate portion 413 narrower than the bottom portion 411 and the top portion 412.

In some embodiments, as shown in FIG. 9, in the transverse direction Y-Y, the lower part of the projection 320 may have a diminishing size in a downward direction. It may enable the projection 320 to have a guiding effect, facilitating the projection 320 to be inserted into the projection receiver 270 of the insulating housing 200 in form of the shaft hole.

Figure 12:
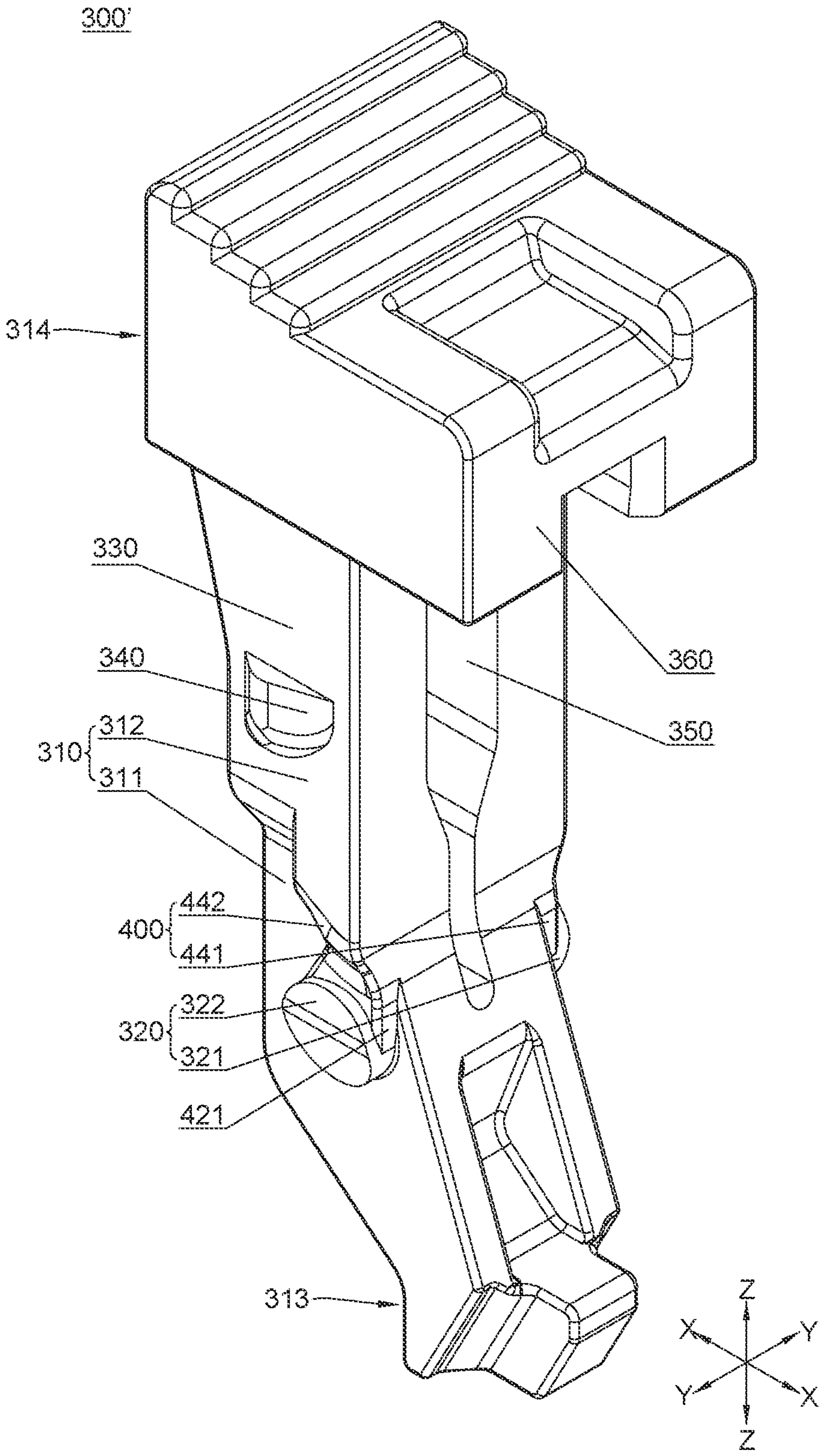
FIG. 12 is a perspective view of the latch according to another exemplary embodiment of the present disclosure.

In some embodiments, as shown in FIG. 12, the side surface 330 of the latch body 310 may be provided with engaging portions 340, and the engaging portions 340 may be located at the upper body 312 of the latch body 310. In addition to the engaging portions 340, a latch 300' in the embodiment shown in FIG. 12 may be generally the same as the latch 300 in the embodiment shown in FIGS. 8 to 11. Therefore, the same reference numbers may be used for the same or similar parts. In some embodiments, the insulating housing 200 may be provided with engaging portions matching the engaging portions 340, for example, engaging portions 260 shown in FIG. 7. The engaging portions 260 may be located at positions, corresponding to the engaging portions 340, on the side walls 241 and 242. The engaging portions 340 may be engaged to the engaging portions 260 or released from the engaging portions 260 by, for example, an external force. The engaging portions 340 may be engaged to the engaging portions 260 when the latch body 310 is located at the locked position under reasonable configuration, such that the latch body 310 may be fixed at the locked position.

Further, as shown in FIGS. 5 and 12, the engaging portions 340 may be protrusions, and the engaging portions 260 may be engaging grooves. In this manner, the engaging portions 340 and the engaging portions 260 have simple structures to facilitate manufacturing.

In some embodiments, as shown FIGS. 9 to 11, the latch body 310 may be provided with a through hole 350. The through hole 350 may penetrate the latch body 310 in the longitudinal direction X-X. The number of the through hole 350 may be one or more. The through hole 350 may facilitate heat dissipation of the electronic card, so that the electronic card may be prevented from being damaged due to excessive heat. Further, as shown in FIGS. 9 to 11, the through hole 350 may extend from the upper body 312 to the lower body 311. In this manner, the through hole 350 has a bigger size for a better heat dissipation effect.

In some embodiments, as shown in FIGS. 10 to 11, a lower end 313 of the latch body 310 may include a curved hook facing the receiving portion 210. The lower end 313 of the latch body 310 may be adjacent to and/or abut against the insulating housing 200 when the latch body 310 is located at the unlocked position. Therefore, the lower end 313 of the latch body 310 may be used for position limiting.

Although the present disclosure has been described through the above embodiments, it should be appreciated that the above embodiments are only for the purpose of illustration and description, and are not intended to limit the present disclosure to the scope of the described embodiments. In addition, it may be understood by a person skilled in the art that the present disclosure is not limited to the above embodiments, a variety of variations and modifications may be made according to the teaching of the present disclosure, and these variations and modifications all fall within the scope of protection of the present disclosure. The scope of protection of the present disclosure is defined by the appended claims and its equivalent scope.

Various changes may be made to the illustrative structures shown and described herein. For example, although the latch described above may be used in a card edge connector, the latch may be used in any suitable electrical connector, such as backplane connectors, daughter card connectors, stacking connectors, Mezzanine connectors, I/O connectors, chip sockets, Gen Z connectors, etc.

Moreover, although many creative aspects have been described above with reference to the right angle connector, it should be understood that the aspects of the present disclosure are not limited to these. Any one of the creative features, whether alone or combined with one or more other creative features, can also be used for other types of electrical connectors, such as coplanar connectors.

In the description of the present disclosure, it is to be understood that orientation or positional relationships indicated by orientation words "front", "rear", "upper", "lower", "left", "right", "transverse direction", "vertical direction", "perpendicular", "horizontal", "top", "bottom" and the like usually are shown based on the accompanying drawings, only for the purposes of the ease in describing the present disclosure and simplification of its descriptions. Unless stated to the contrary, these orientation words do not indicate or imply that the specified apparatus or element has to be specifically located, and structured and operated in a specific direction, and therefore, should not be understood as limitations to the present disclosure. The orientation words "inside" and "outside" refer to the inside and outside relative to the contour of each component itself.

For facilitating description, the spatial relative terms such as "on", "above", "on an upper surface of" and "upper" may be used here to describe a spatial position relationship between one or more components or features and other components or features shown in the accompanying drawings. It should be understood that the spatial relative terms not only include the orientations of the components shown in the accompanying drawings, but also include different orientations in use or operation. For example, if the component in the accompanying drawings is turned upside down completely, the component "above other components or features" or "on other components or features" will include the case where the component is "below other components or features" or "under other components or features". Thus, the exemplary term "above" can encompass both the orientations of "above" and "below". In addition, these components or features may be otherwise oriented (for example rotated by 90 degrees or other angles) and the present disclosure is intended to include all these cases.

It should be noted that the terms used herein are only for describing specific embodiments, and are not intended to limit the exemplary embodiments according to the present application. As used herein, an expression of a singular form includes an expression of a plural form unless otherwise indicated. In addition, the use of "including", "comprising", "having", "containing", or "involving", and variations thereof herein, is meant to encompass the items listed thereafter (or equivalents thereof) and/or as additional items.

It should be noted that the terms "first", "second" and the like in the description and claims, as well as the above accompanying drawings, of the present disclosure are used to distinguish similar objects, but not necessarily used to describe a specific order or precedence order. It should be understood that ordinal numbers used in this way can be interchanged as appropriate, so that the embodiments of the present disclosure described herein can be implemented in a sequence other than those illustrated or described herein.

What is claimed is:

1. A latch for a card edge connector, the card edge connector comprising a housing having a slot elongating in a longitudinal direction, the latch comprising:

a body comprising an upper portion and a lower portion narrower than the upper portion in a transverse direction perpendicular to the longitudinal direction;

a projection extending from the lower portion of the body in the transverse direction; and a protrusion extending from the lower portion between the projection and the upper portion of the body, the protrusion comprising:

a bottom portion, a top portion, and an intermediate portion narrower in the longitudinal direction than the top portion and the bottom portion.

2. The latch of claim 1, wherein:

the lower portion has a first length in the longitudinal direction; and the protrusion has a second length in the longitudinal direction, shorter than the first length.

3. The latch of claim 2, wherein:

the bottom portion is adjacent the projection;

the top portion is adjacent the upper portion of the body; and the top portion extends beyond the bottom portion in the transverse direction.

4. The latch of claim 1, wherein:

the bottom portion is joined to the projection;

the top portion is joined to the upper portion of the body; and the top portion extends beyond the bottom portion in the transverse direction.

5. The latch of claim 4, wherein:

the top portion is flush with the upper portion of the body.

6. The latch of claim 1, wherein:

a lower part of the projection diminishes in size in the transverse direction along a vertical direction perpendicular to the transverse direction and the longitudinal direction.

7. The latch of claim 1, wherein:

the body comprises a first side surface facing the slot of the connector and a second side surface opposite the first side surface and facing away from the slot of the connector; and the protrusion is disposed closer to the first side surface than the second side surface.

8. The latch of claim 7, wherein:

the protrusion comprises a first end surface facing the slot of the connector and a second end surface opposite the first end surface and facing away from the slot of the connector; and the second end surface curves toward the slot.

9. An electrical connector, comprising:

a housing comprising a slot elongated in a longitudinal direction; and a latch comprising:

a body comprising a first side surface facing the slot of the housing, a second side surface opposite the first side surface and facing away from the slot of the housing, and a third side surface between the first side surface and the second side surface, a projection extending in a transverse direction perpendicular to the longitudinal direction from the third side surface of the body, the body of the latch pivotably connected to the housing by the projection such that the body of the latch is pivotable between a locked position and an unlocked position, and a protrusion extending from the projection towards an upper portion of the body so as to be disposed in a gap between the third side surface of the body and the housing, the protrusion comprising a first end surface facing the slot of the housing and a second end surface opposite the first end surface and facing away from the slot of the housing, the second end surface curving toward the slot.

10. The latch electrical connector of claim 9, wherein:

the protrusion is disposed closer to the first side surface of the body of the latch than the second side surface of the body of the latch.

11. The electrical connector of claim 9, wherein:

the protrusion includes a bottom portion connected to the projection; and the projection extends outwards from the body beyond the bottom portion in the transverse direction.

12. The electrical connector of claim 11, wherein:

the protrusion comprises a top portion connected to the upper portion of the body; and the top portion extends outwards from the body beyond the bottom portion in the transverse direction to form an upper projecting platform between the top portion and the bottom portion.

13. The electrical connector of claim 12, wherein:

the protrusion comprises an intermediate portion between the top portion and the bottom portion; and the intermediate portion has an outer surface smoothly connecting the top portion and the bottom portion.

14. The electrical connector of claim 13, wherein:

the intermediate portion is narrower than the bottom portion and the top portion in the longitudinal direction.

15. The electrical connector of claim 12, wherein:

the housing comprises a space configured to receive the latch;

the space comprises a side wall having a lower projecting platform; and the lower projecting platform is disposed in a movement path of the upper projecting platform from the locked position to the unlocked position.

16. The electrical connector of claim 9, wherein:

the protrusion comprises a first end surface facing the slot and a second end surface facing away from the slot; and the second end surface is adjacent to and/or abuts against a portion on the housing when the body of the latch is in the unlocked position.

17. An electrical connector comprising:

a housing comprising a base extending in a longitudinal direction and a tower disposed at an end of the base and extending in a vertical direction perpendicular to the longitudinal direction; and a latch comprising a pair of projections pivotably disposed in the tower, a body extending in the vertical direction and rotatable about an axis connecting the pair of projections, and a pair of protrusions extending from respective projections of the pair and rotatably about the axis, wherein each of the pair of protrusions comprise a bottom portion, a top portion, and an intermediate portion narrower in the longitudinal direction than the top portion and the bottom portion.

18. The electrical connector of claim 17, wherein:

the pair of protrusions extend from respective projections towards respective sides of an upper portion of the body.

19. The electrical connector of claim 17, wherein:

the body of the latch comprises an upper portion and a lower portion narrower than the upper portion in a transverse direction perpendicular to the longitudinal direction and the vertical direction;

the pair of projections extend from the lower portion of the body in the transverse direction; and the pair of protrusions extend from respective projections of the pair to respective sides of the upper portion.

20. The electrical connector of claim 19, wherein:

the body of the latch comprises a through hole extending from the upper portion to the lower portion in the vertical direction.

21. The electrical connector of claim 19, wherein:

the lower portion of the body comprises a curved hook disposed in the base of the housing.

22. The electrical connector of claim 17, wherein:

the latch and the housing comprise matching portions configured to engage with each other when the latch is in a locked position.

* * * * *